United States Patent [19]
Chersky et al.

[11] 3,888,434
[45] June 10, 1975

[54] METHOD OF PIPELINE TRANSPORTATION OF NATURAL GAS

[76] Inventors: Nikolai Vasilievich Chersky, prospekt Lenina, 38B, kv. 14, Yakutsk; Alexandr Petrovich Klimenko, ulitsa Repina, 13, kv. 73, Kiev; July Izrailevich Bokserman, ulitsa A. Tolstogo, 12, kv. 47, Moscow; Alexandr Isaevich Kalina, ulitsa Grimau, 5/1, korpus 1, kv. 24, Moscow; Farit Abdrakhmanovich Karimov, ulitsa Planetnaya, 19, kv. 5, Moscow, all of U.S.S.R.

[22] Filed: Mar. 11, 1974

[21] Appl. No.: 450,156

[30] Foreign Application Priority Data
Mar. 12, 1973 U.S.S.R............................ 1889052

[52] U.S. Cl.................. 243/38; 48/190; 104/138 R; 104/155; 243/3
[51] Int. Cl............................................. B65g 51/02
[58] Field of Search............ 104/138 R, 147 R, 154, 104/155, 156; 243/1, 3, 38; 105/365; 48/190, 48/191; 137/1

[56] References Cited
UNITED STATES PATENTS

| | | | |
|---|---|---|---|
| 2,270,016 | 1/1942 | Benesh | 48/190 |
| 3,514,274 | 5/1970 | Cahn et al. | 48/190 |
| 3,796,164 | 3/1974 | Nogi et al. | 104/138 R |

*Primary Examiner*—Lloyd L. King
*Assistant Examiner*—Randolph A. Reese
*Attorney, Agent, or Firm*—Holman & Stern

[57] ABSTRACT

Natural gas is transported in the form of hydrates loaded into containers which are propelled through a pipeline filled with natural gas. The pressure and temperature in the pipeline are maintained at such a level so as to preserve the physical state of the hydrates in the course of their transportation. This method of natural gas transportation increases considerably the transmission capacity of the pipeline at comparatively low specific capital investments.

3 Claims, 4 Drawing Figures

METHOD OF PIPELINE TRANSPORTATION OF NATURAL GAS

The present invention relates to methods of pipeline transportation of natural gas.

Methods of pipeline transportation of natural gas wherein natural gas is pumped through a pipeline via compressor stations located at certain distances from one another along the pipeline are widely known in the prior art. The natural gas is transported at a temperature approaching that of the ambient medium.

The main disadvantage of the known method is the comparatively low transmission capacity of the pipeline which calls for high specific investments in the transportation of the gas.

Methods of pipeline transportation of natural gas wherein the gas is compressed to from 100–120 kgf/cm² and cooled approximately to minus 70°C are also known.

In these other widely known methods of natural gas transportation the gas is liquefied and pumped through a pipeline in the supercooled state under a pressure of about 50 kgf/cm² and at a temperature of about minus 120°C. The liquefied gas is conveyed by pumping stations located at certain distances from one another along the pipeline.

The transmission capacity of the pipeline in the above described methods is increased by raising the density of the pumped natural gas.

The movement of the gas flow through a pipeline is expressed by the equation $$\frac{\Delta P}{l} = \frac{\lambda}{d} \frac{\omega}{2} \rho$$

where $\Delta/l$ = pressure drop per unit length of the pipeline;
$\lambda$ = coefficient of resistance;
$d$ = pipeline diameter;
$\omega$ = velocity of gas flow in the pipeline;
$\rho$ = density of the pumped natural gas.

It follows from the above equation that an increase in density $\rho$ by $n$ times calls for decreasing the velocity w by $n^{1/2}$ times provided the value of $\Delta P /l$ remains constant.

Therefore the increase of the density $\rho$ by n times increases the transmission capacity of the pipeline by as little as $n^{1/2}$ times.

It can be concluded from the above that the increase in the density of the pumped gas does not lead to a proportional increase in the transmission capacity of the pipeline. At the same time, the increase in the gas density calls for higher capital investments due to the employment of thick-walled pipes to withstand a higher pressure or of pipes made of costly cold-resistant materials to withstand low temperatures.

Likewise, it proves impossible to achieve a considerable increase in the transmission capacity of the pipeline by increasing the velocity w of the gas flow since in this case the losses of pressure per unit length of the pipeline grow proportionally to the squared velocity of the flow.

An object of the present invention is to provide a method of transportation of natural gas which would increase considerably the transmission capacity of the pipeline utilizing a comparatively high density natural gas and involving low specific capital investments.

In accordance with these and other objects we hereby provide a method of pipeline transportation of natural gas wherein, according to the invention, the natural gas is transported in the form of hydrates which are loaded into containers with the latter being propelled through a pipeline filled with natural gas, and with the pressure and temperature in said pipeline being maintained at such a level which will preserve the physical state of the hydrates during the process of transportation.

It is practicable that the containers should be propelled through the pipeline by means of the compressed and cooled natural gas and that the gas pressure should change throughout the length of the pipeline from 50 kgf/cm² to 20 kgf/cm², and that the temperature should change correspondingly from minus 40°C to minus 10°C.

The employment of natural gas for propelling the containers through the pipeline makes it possible to increase still more the amount of natural gas transported through the pipeline.

It is also practicable to make the containers in the form of an open type, to load them only partially, and combine them into a train, and which propelled trains should be arranged at such intervals along the pipeline that the major part of the propelling natural gas would be inside the containers.

The connection of the containers into a train and their being partially filled with hydrates makes it possible to reduce the pressure drop since the pressure will in this case be equalized by the gas flowing from the containers into the pipeline during the course of transportation.

The method of pipeline transportation of natural gas according to the invention allows the transmission capacity of the pipeline to be increased by at least 3–4 times as compared with a pipeline through which the natural gas is transported at a temperature closely approaching that of the ambient medium. The specific capital investments for the method of gas transportation, according to the invention, are considerably lower than in the above-quoted known methods, since this method utilizes thin-walled carbon steel pipes.

Other objects and advantages of the method of pipeline transportation of natural gas will become apparent from the detailed description of the concrete embodiments of the present invention with reference to the accompanying drawings, in which.

Figure 1:
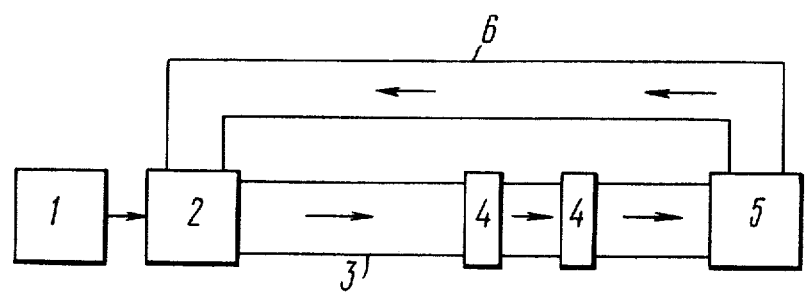
FIG. 1 is a block diagram of the system for transportation of natural gas.

The natural gas and water are delivered under a pressure of from 60–40 kgf/cm² to the hydrate-producing plate 1 (FIG. 1). The gas is previously cooled to a temperature of minus 20° – 30°C and divided into two streams. One stream is mixed with sprayed water previously cooled to a temperature of + 1° or 2°C. The mixing of the natural gas with sprayed water produces finely divided hydrates. Then these hydrates are supercooled by the other stream of natural gas which has been previously cooled to minus 45°C approximately.

The supercooled hydrates are then delivered into loading devices 2 in which the containers (not shown in the drawings) are loaded with hydrates. The hydrates of natural gas can also be produced by other suitable methods.

Under normal conditions, i.e. at atmospheric pressure and a temperature of +20°C the density of natural gas is about 0.72 kg/m$^3$. A ton of the monolithic hydrate contains 129 kg of natural gas approximately. Therefore, it can be concluded that the density of the natural gas in the hydrate is about 130 kg/m$^3$; if the hydrates in the container are granulated, the density of natural gas in the hydrates is 103 kg/m$^3$. Such a natural gas density in the hydrates corresponds to the density of the natural gas subjected to a pressure of 130 kgf/cm$^2$. In order to preserve the physical state of the natural gas hydrates at a temperature of minus 20°C (FIG. 2) the pressure must be about 10 kgf/cm$^2$ (point "$a$" of the phase equilibrium curve of hydrates for pure methane $CH_4$).

The containers loaded with hydrates are propelled through a pipeline 3 (FIG. 1) filled with natural gas. The propulsion is effected by means of the natural gas which is compressed and cooled at stations 4 spaced at certain distances from one another throughout the length of the pipeline 3. Said stations comprise compressor and cooling plants (not shown in the drawings).

The natural gas used for propelling the containers is compressed at the stations 4 to a pressure of about 50 kgf/cm$^2$ and cooled to minus 40°C. As the containers move through the pipelines 3 at a speed of up to 120 km/hr, pressure in the pipeline drops gradually and, before the next station 4 it amounts to about 20 kgf/cm$^2$ while the temperature rises to minus 10°C (point $b$ in FIG. 2). At such thermodynamic parameters of the natural gas used for propelling containers, the hydrates of natural gas in these containers retain their physical state.

Figure 2:
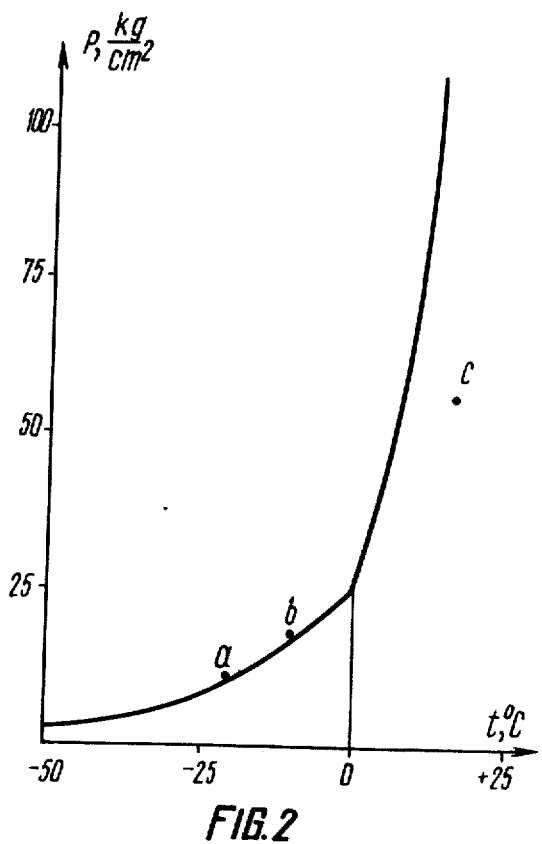
FIG. 2 shows a curve of phase equilibrium of hydrates.

At the terminal point of the pipeline 3 the containers are delivered into a disintegrating unit 5 where the hydrates are decomposed into gas and water by raising the temperature above the equilibrium temperature (point "$c$" in FIG. 2). The gas is then conveyed from the unit 5 to the consuming installation (not shown) and the water, into industrial water supply systems (not shown in the drawings). The empty containers move into a pipeline 6 and return to the loading device 2 being propelled by the natural gas under a pressure of 1.2 – 3 kgf/cm$^2$, at the ambient temperature of the medium, and at a speed of up to 250 km/hr.

Figure 3:
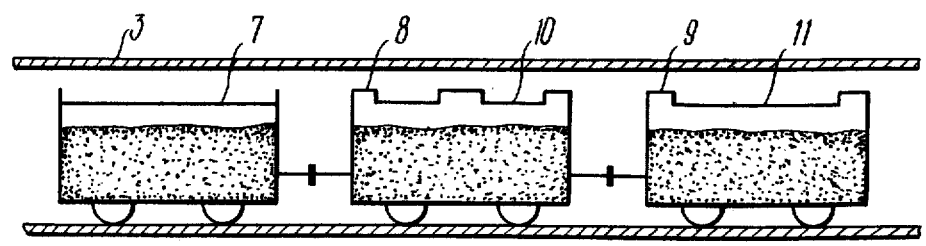
FIG. 3 shows the arrangement of a container train in the pipeline, longitudinal section.

In order to increase the transmission capacity of the pipeline, the containers 7, 8, 9 (FIG. 3) are combined into a train. When the natural gas hydrates are transported in container trains, the containers are loaded only to a part of their capacity and the free volume of each container 7, 8, 9 is filled with the natural gas which propels said containers through the pipeline 3. The internal space of the pipeline 3 communicates with the free volume of the container 7 by making the latter completely open at one side.

For communicating the free volume of the container 8 with the internal space of the pipeline, said container has hatches 10 while the container 9 is provided with slots 11 for the same purpose.

The trains can be made up of containers in any desired combination of types.

Figure 4:
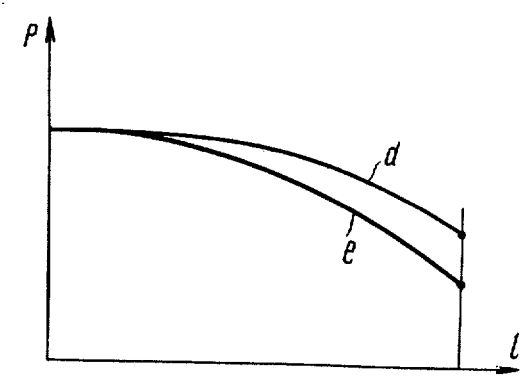
FIG. 4 is a chart showing the variations in the pressure of the container-propelling natural gas in the pipeline.

The free volume of the container 7, 8, 9 is filled with the natural gas which is contained in the pipeline 3, and which propels the container train and which moves together with the container. While the containers 7, 8 9 are being propelled, the natural gas contained in their free volumes serves as a source of potential energy. As the pressure in the pipeline 3 drops gradually, the natural gas flows from the container into said pipeline thus diminishing the pressure differential. The curve "$d$" (FIG. 4) illustrates the nature of the pressure drop p of the natural gas throughout the length 1 of the pipeline 3 within the section of the pipeline located between two adjacent stations 4 or between the loading device 2 and the station 4, or between the station 4 and the hydrate disintegrating unit 5 during the propulsion of trains with the containers 7, 8, 9 being partly loaded with the hydrates of natural gas. Curve "$e$" shows the same pressure drop for containers fully loaded with the hydrates of natural gas.

The propelled container trains are arranged along the pipeline 3 with intervals which allow the larger part of the propelling natural gas to be contained in the free volume of said containers.

The method of natural gas transportation is implemented as follows.

The hydrates produced at the hydrate plant 1 are delivered to a loading device 2 wherein they are loaded into containers with the latter being delivered into a pipeline 3. The loaded containers are delivered into the pipeline 3 together with the natural gas compressed to from 40 – 60 kgf/cm$^2$ and cooled to minus 40°C approximately. The containers are then propelled through the pipeline 3 by the energy of the compressed and cooled natural gas. In the process of transportation of the containers through the pipeline 3, the pressure of the container-propelling natural gas drops due to the gas-dynamic and mechanical losses during the process of transportation. Likewise, during the course of transportation of said containers through said pipeline 3, the temperature of the natural gas rises owing to the transfer of heat from the ambient medium through the pipeline walls and due to mechanical friction of the container against the walls of the pipeline 3.

The pressure and temperature of the container-propelling natural gas throughout the propulsion zone should be, higher than 20 kgf/cm$^2$ and lower than minus 10°C respectively if the physical state of the natural gas hydrates transported in said containers is to be preserved. When the hydrates in the containers and the natural gas arrive at a station 4, their pressure is raised and their temperature lowered to enable their transportation to the next station 4. After passing the stations 4 the containers and the propelling natural gas enter the hydrate-disintegrating unit 5 where said hydrates are decomposed into water and gas by raising their temperature above the equilibrium temperature of the hydrate formation. The gas is delivered to the consuming installations and water is discharged into industrial water supply systems.

The employment of natural gas for propelling containers through a pipeline makes it possible to increase the amount of natural gas transported through a pipeline.

The empty containers are delivered from the unit 5 into a pipeline 6 for returning same to the loading device 2. The pressure in the pipeline 6 is maintained within 3–1.2 kgf/cm² while the temperature therein is equal to that of the ambient medium.

By transporting natural gas by the method according to the invention through a single pipeline of 1420 mm diameter, the yearly transmission capacity of this pipeline is about 150 billion cubic meters of gas.

By transporting natural gas by the method according to the invention through a pipeline of 1420 mm diameter at a pressure of 75 kgf/cm¹ and a temperature equal to that of the ambient medium, the yearly transmission capacity of this pipeline is about 30 billion cubic meters of gas.

The pipes used for the transportation of natural gas by the method according to the invention are of the spiral-seam type made of common carbon steel which are considerably cheaper than the straight-seam high pressure pipes.

An additional advantage of the method according to the invention is the simultaneous transportation of large amounts of commercially pure water required for industry.

What is claimed is:

1. A method of transporting natural gas by pipeline comprising converting the natural gas into the form of hydrates; loading said hydrates into containers; propelling said containers loaded with said hydrates through said pipeline filled with natural gas; and maintaining the pressure and the temperature in said pipeline at such a level as to preserve the physical state of said hydrates during the process of transportation.

2. A method according to claim 1, wherein the containers are propelled through the pipeline by natural gas which has been previously compressed and cooled, so as to allow the gas pressure to change throughout the pipeline from 50 to 20 kgf/cm², while its temperature, correspondingly, may change from minus 40°C to minus 10°C.

3. A method of transporting natural gas wherein natural gas is transported in the form of hydrates; comprising loading said hydrates into open containers; filling said containers only to a part of their capacity; combining said containers into trains; propelling said trains through said pipeline by the natural gas which has been previously compressed and cooled; maintaining the gas pressure throughout the pipeline at from 50 to 20 kgf/cm², and the temperature, correspondingly, to from minus 40°C to minus 10°C thus making it possible to preserve the physical state of said hydrates during the process of transportation; and arranging said trains along said pipeline during the process of transportation at such intervals that the major part of the natural gas propelling said trains is contained inside of said containers.

* * * * *